Jan. 16, 1945. H. F. WATERS 2,367,477
METHOD OF MAKING CONTAINERS AND PRODUCTS THEREOF
Filed Jan. 9, 1941 3 Sheets-Sheet 1
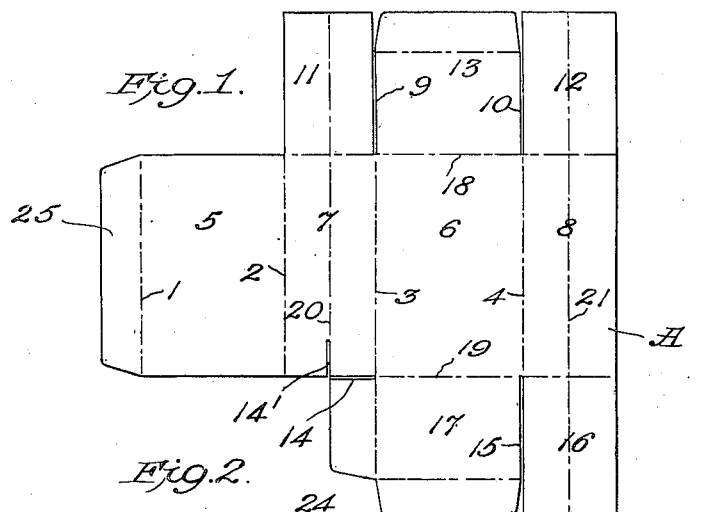
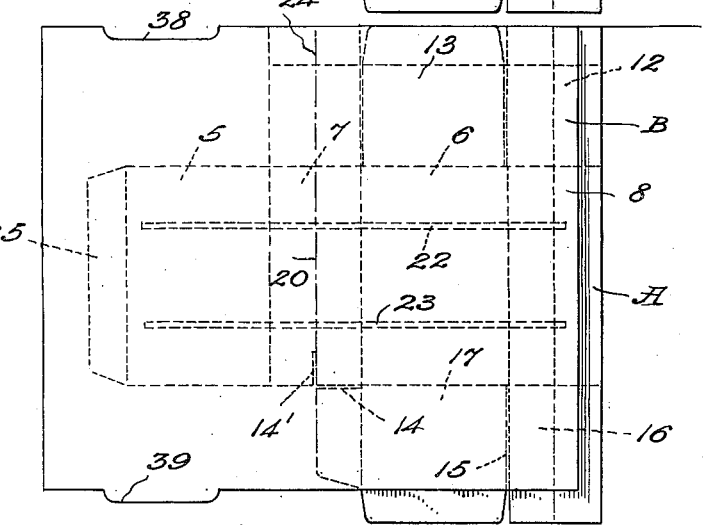
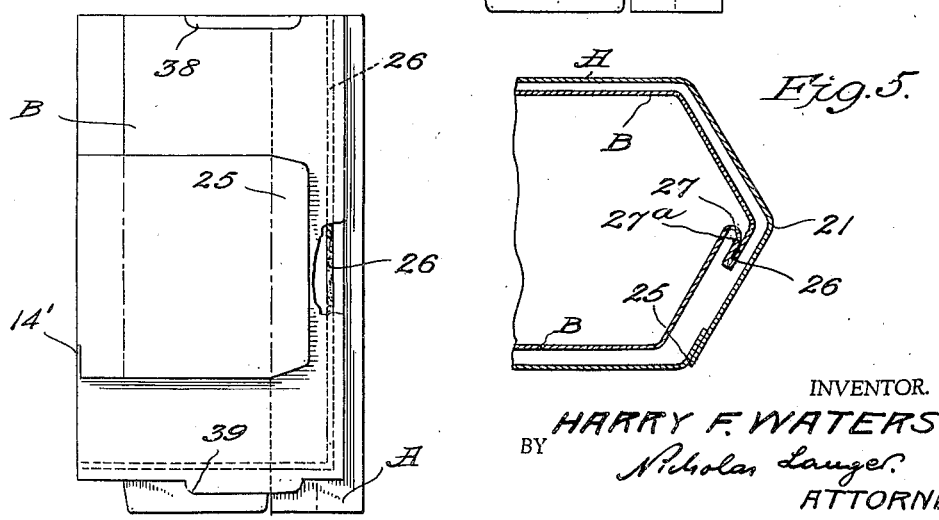
INVENTOR.
HARRY F. WATERS
BY Nicholas Lauger
ATTORNEY Jan. 16, 1945. H. F. WATERS 2,367,477
METHOD OF MAKING CONTAINERS AND PRODUCTS THEREOF
Filed Jan. 9, 1941 3 Sheets-Sheet 2
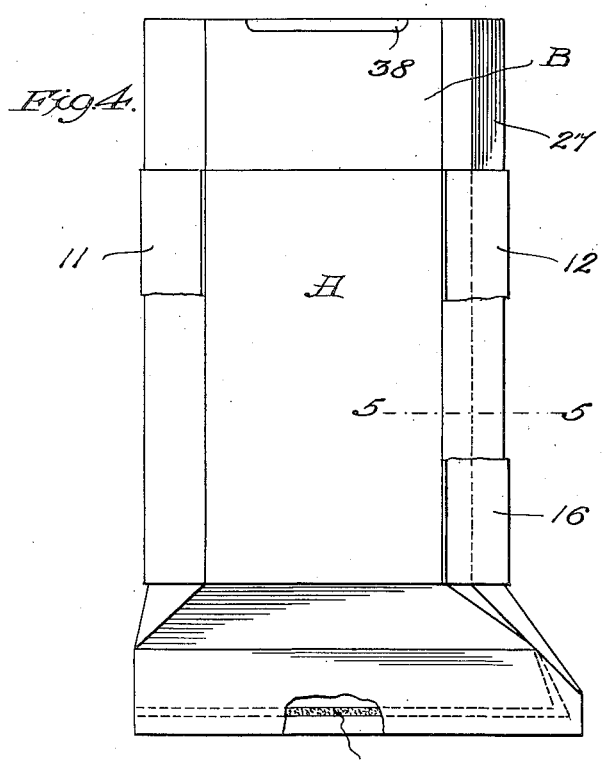
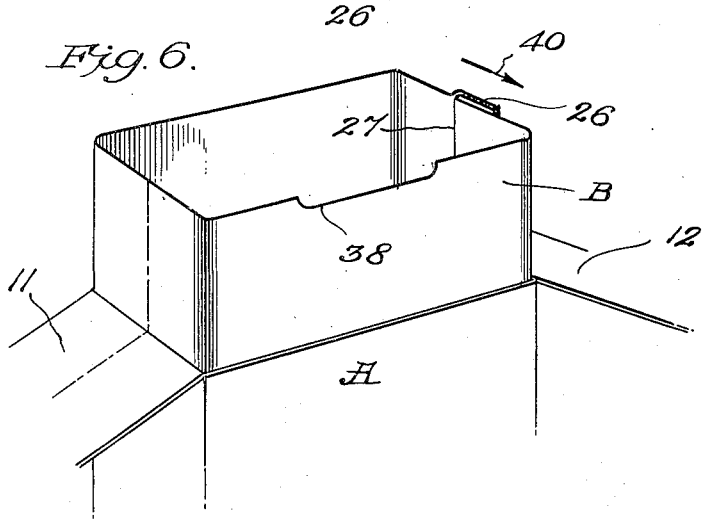
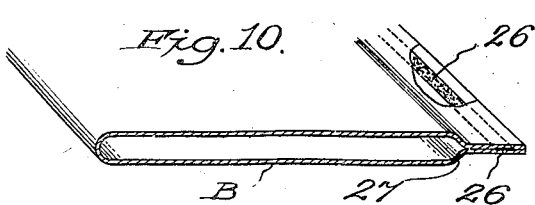
INVENTOR.
HARRY F. WATERS
BY Nicholas Lauger
ATTORNEY

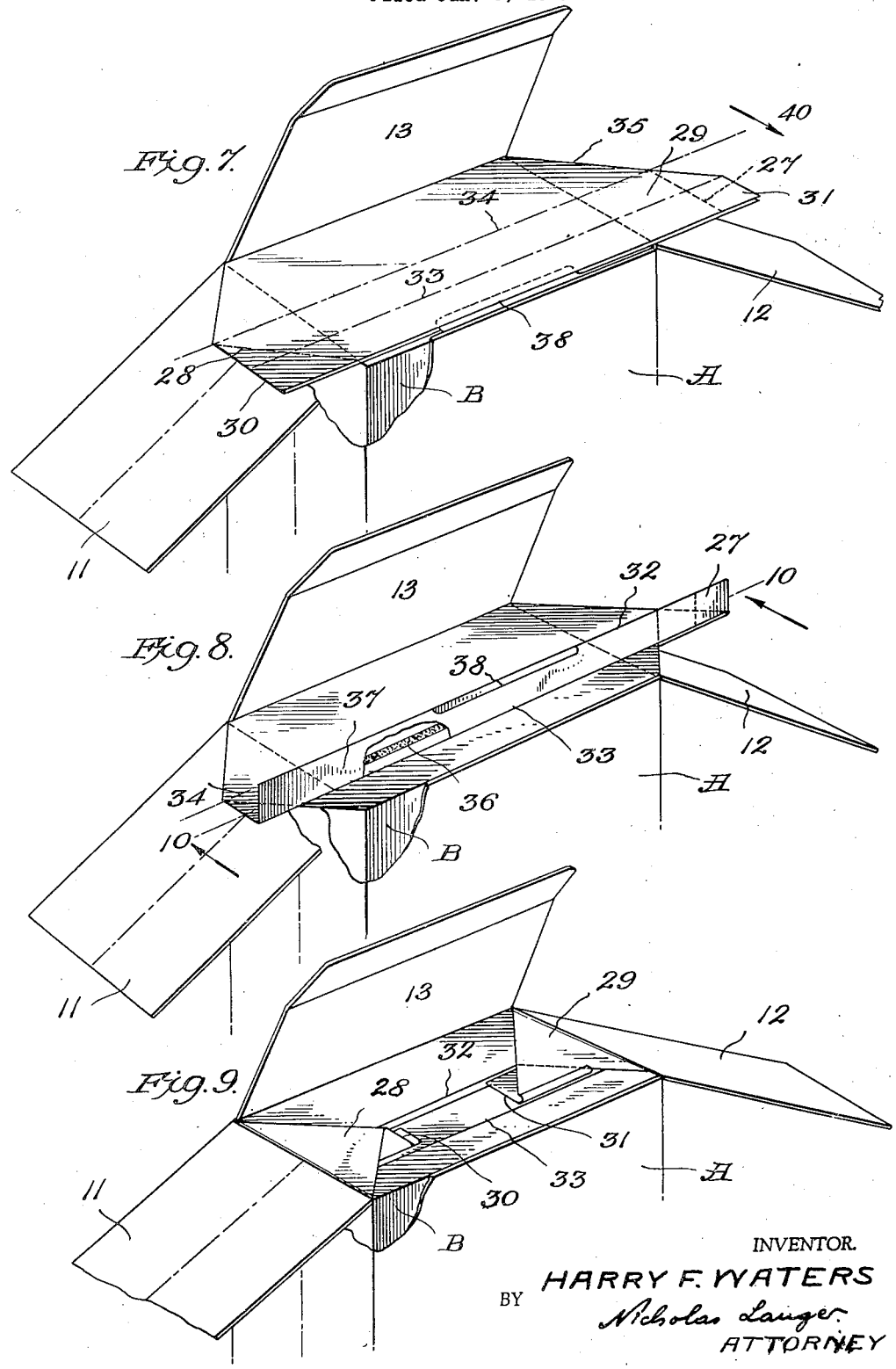

Patented Jan. 16, 1945

2,367,477

UNITED STATES PATENT OFFICE 2,367,477

METHOD OF MAKING CONTAINERS AND PRODUCT THEREOF

Harry F. Waters, New York, N. Y.

Application January 9, 1941, Serial No. 373,769

3 Claims. (Cl. 229—14)

The present invention relates to containers and more particularly to a container of novel and improved character and to a method of producing the same.

Heretofore, various paper containers for holding liquids and similar materials were proposed. Generally, these containers comprised an external container of paper, cardboard or some other sheet-like material having some strength and an inner receptacle or container of a substantially flexible character, impermeable to liquids and gases. This inner receptacle or container was generally constituted of paper having a fluid-proof material bonded thereto throughout the surface thereof. Preferred coating materials were certain synthetic resins such as nitrocellulose, Bakelite and particularly certain rubber compounds such as latex and a hydrochloride of rubber sold under the name of Pliofilm. It was preferred to use coating materials which were of a thermo-plastic character and which could be united or bonded with layers of similar materials by the application of heat and pressure or of heat alone.

It was generally recognized that packages of this type had to satisfy certain critically important requirements. Thus, it was necessary to have a complete and unbroken surface of the fluid-proof material in contact with the liquid in order to prevent leakage thereof. It was also recognized that in order to provide a commercially successful container for the shipping and storage of liquid and granular materials such as coffee etc., the container had to be of such character as to permit shipping in a flat or knocked-down condition in order to take up a minimum of space and thereby to reduce shipping costs.

Due to the fact that such containers were used once and were discarded after removal of the contents, they had to be of an inexpensive character and capable of being manufactured at a very low price to be competitive with other packaging methods such as cans, jars and the like. A very important consideration was the necessity of providing a completely flat seal for sealing the top of the container. In other words, a seal of such character had to be provided in which only two layers of the inner receptacle have been placed against each other face to face and in which there were no more than two layers of the inner liner at any point throughout the full length of the seam.

While various containers proposed and manufactured satisfied some of these requirements, none of the prior containers satisfied all of these important considerations. Although from time to time various suggestions and proposals were made to solve the outstanding problem and to provide a container satisfying all of these critically important requirements, none, as far as I am aware, of these prior suggestions and proposals was completely satisfactory and successful on a practical and commercial scale.

I have discovered that the outstanding problem may be solved in a remarkably simple manner.

It is an object of the present invention to provide a container, particularly for oil, milk, coffee and similar fluid or granular materials which completely eliminates the above disadvantages of conventional fluid-tight packages.

It is another object of the present invention to provide a container of novel and improved character constituted of an external container having at least some rigidity and strength and an inner receptacle of fluid-tight character associated therewith.

It is a further object of the invention to provide a container of the described character which may be directly manufactured from strips or webs of sheet-like material forming a blank for the external carton and for the inner fluid-tight container by means of a succession of simple operations simultaneously forming both the inner receptacle and the external container.

Still another object of the invention is to provide a novel type of heat-seal for the inner liner of a fluid-tight container which is of a continuous character and is adapted to seal two side edges of the inner envelope in a single operation.

It is also within contemplation of the invention to provide a fluid-tight container of composite character which may be shipped in a flat condition and which may be opened for the purpose of filling and sealing in a single operation simultaneously opening or "squaring-up" both the inner and the outer containers.

Moreover, the invention proposes a new method of sealing a filled container of the described character with a single, flat and continuous top seal completely free from re-entrant folds and in which only two layers of materials are facing each other throughout the full extension of the seal.

The invention also contemplates a container for shipping and mechandising materials under a liquid or gas-tight seal which is extremely simple in character and which may be manufactured, sold and used on a practical and commercial scale at a low cost.

Other and further objects and advantages of the invention will become apparent from the following description taken in conjunction with the accompanying drawings in which:

Fig. 1 illustrates a plan view of the blank of an outer container embodying the principles of the invention;

Fig. 2 depicts a similar view of the blank shown in Fig. 1, having the inner liner subsequently forming the inner container or receptacle attached thereto;

Fig. 3 shows a top elevational view of the blank and liner folded about their longitudinal center line and having a heat seal of special character applied thereto;

Fig. 4 is a front elevational view of the container of the invention in its partially opened condition and having both the upper and the lower extremities of the inner container exposed to view;

Fig. 5 is a horizontal sectional view taken on line 5—5 of Fig. 4;

Fig. 6 illustrates a perspective view, somewhat fragmentary in character, of the container in the completely opened or "squared-up" condition, ready for filling;

Fig. 7 depicts a similar view of the top portion of the container after the filling operation, having the upper terminal portions of the inner container folded down into a flat position in the plane defined by the hinge lines of the side panels;

Fig. 8 shows a perspective view of the top portion of the container having the flattened upper terminal portions of the inner container or bag bent upwards along a line remote from the center line of the container, preliminary to the heat-sealing operation;

Fig. 9 is a similar view of the upper portion of the container illustrating the tabs resulting from folding down the upper seal; and Fig. 10 is a horizontal sectional view taken on line 10—10 of Fig. 8.

Broadly stated, according to the principles of my invention, I provide a blank stamped out or otherwise formed of a sheet of cardboard, or the like, having score lines therein to define a plurality of side and end walls or panels and a plurality of flaps hingedly connected to such walls. I attach by cementing or some other similar operation a substantially rectangular sheet of a liner likewise constituted of paper and bearing on at least the inner side thereof a layer or coating of a thermo-plastic and fluid-tight material. Of course, this liner may be entirely constituted of a fusible fluid-tight material of the described character with equal or similar results. Hereafter, I fold the resulting structure along a center line to place the two sides of the structure into an overlapping position in which the side edges of the liner are superposed upon each other and are in a position for the application of a heat-seal adapted to convert the liner into an envelope sealed along its bottom and its side edge.

I found that substantial advantages are obtained by forming a single, continuous, and right-angle or L-shaped seam which is uniform along the full length or extension thereof, so that double sealing of any portion of the receptacle is avoided. After this sealing operation, the inner container, which at this stage of the process is a completely flat envelope, is sealed at two edges thereof, leaving only the top open for the introduction of the contents. Folding over and cementing one of the side extremities of the blank onto a corresponding glue flap of the blank converts the structure into a container in a flattened condition which may be squared-up in a single operation whereby both the external container and the inner envelope are simultaneously opened. After the container has been "squared-up" the bottom portion of the inner container or envelope may be folded and tucked into the outer receptacle, the bottom closure flaps may be inserted, and the container is ready for filling. This is accomplished by means of a conventional filling machine, as those skilled in the art will readily understand.

As has been pointed out in the foregoing, it is one of the most important requirements in a container of the described character to provide a top seam in which only two layers of the liner are placed against each other so that re-entrant folds, intervening doubled-up layers or folds and consequent danger points of leakage are eliminated. Although the critical importance of this consideration has been generally recognized, none of the conventional structures or sealing methods accomplish the desired result. I have found that a seal of the desired character may be obtained by folding the upper portions of the inner container in a predetermined direction with respect to the side or main seam and fold of the envelope and applying the seal in a position of the upper terminal portions of the inner receptacle which is off-center to a substantial extent, as will be set forth more fully hereinafter.

Referring now more particularly to the drawings, a preferred embodiment of the invention is shown which is a container particularly adapted for packaging liquids, coffee and other materials which have to be sealed liquid or gas-tight to avoid leakage of fluids into or out of the container. Reference character A generally denotes a blank, stamped out of cardboard or the like, and forming the external container. Blank A is provided with parallel score lines 1, 2, 3, 4 defining front and back panels 5 and 6 respectively and end panels 7 and 8. Incisions 9 and 10 define top end flaps 11 and 12 and top closure flap 13, while incisions 14 and 15 provide bottom end flap 16 and bottom closure flap 17. All of these flaps are hingedly connected to the body of the blank along conventional hinge lines 18 and 19. In addition, I provide medial score lines 20 and 21 along the center lines of end panels 7 and 8. These medial score lines have the object of permitting the folding of the container into a flat or knocked-down position after the inner container has been formed.

The next operation is securing the inner liner generally denoted by reference character B to the blank by means of lines or spots of adhesive 22 and 23. As it will be best observed in Fig. 2, this liner is of a substantially rectangular character, preferably cut from a continuous strip or web of material, and is provided with a top layer or film of a fusible material of a fluid-proof character which covers the complete surface thereof. It will be noted that due to the fact that the line or spots of adhesive connecting liner B to blank A extend throughout the various panels of the blank, the liner material will follow the blank through all subsequent folding operations.

By folding the structure resulting from the connection of liner and blank along center line 24, the structure shown in Fig. 3 will result, in which liner B is folded in such a position that its two halves are exactly facing each other. The structure is now ready for the application of a heat seal which closes the side and the bottom edges of the liner and converts it into an envelope open at the top. This sealing may be accomplished by successively applying a longitudinal end seal and a bottom seal at right angles to each other. As those skilled in the art know, this heat seal is made by the application of pressure and heat, or of heat alone, to the region where such seal is desired and such heat and pressure is exerted on the material by means of suitable sealing members or jaws. Although sealing members of various characters may be used I prefer to employ a sealing device of the character disclosed in U. S. Patent 2,125,758, issued to me on August 2, 1938.

I have found that it is preferable to provide the side and bottom seal on the envelope in a single operation by means of an L-shaped sealing member whereby a continuous L-shaped seam 26 is provided. The advantage of this type of seam is that it is of a completely continuous and uninterrupted character and that all of the portions of the seam are exposed to heat and pressure only once. This avoids weakening the material at such points where the heat and pressure has been applied twice, as would be the case when a right angle seal is provided by the combination of two individual seams at right angles to each other and crossing each other in one region.

After the L-shaped seam has been applied and the liner has been converted into an inner envelope or container having only one of its sides open, end wall 8 of the blank A may be folded along medial line 21 and may be adhesively secured to glue flap 25. This will complete the outer container. It will be observed that folding of end wall 8 along medial line 21 will at the same time also fold the lateral marginal portions of the envelope along line 21. Thus, a fold 27 will be introduced into the envelope along a line removed from the seam whereby the seam proper 26 is protected from mechanical stresses. This is an important feature of the present invention and greatly reinforces the inner container due to the fact that all seams in the envelope are placed beyond the fold line which prevents pulling the two layers constituting the seam apart due to the pressure or weight of the contents. At the same time, since there is a portion 27a of the envelope between fold 27 and seam 26 which is unsealed, the two layers of the seam are capable of restricted displacement in that region whereby an expansion joint-like effect is obtained (Fig. 5). This effect makes it possible for the envelope to completely conform to the inner walls of the outer container and to be fully supported thereby.

After the operation involving the application of the L-shaped seam 26 and forming of the main fold 27, the container is ready for shipping in flat condition. It will be readily appreciated that in this condition the outer and inner containers are both flattened out and the inner container is finished and sealed at all sides thereof except for the top which remains open for the introduction of the contents.

To further facilitate understanding the relation of the external carton and of the inner container, reference may be had to Figs. 4 and 5 of the drawings, illustrating the package of the invention in a partially squared-up condition with the various flaps bent into such a position that they do not interfere with the visibility of the top and bottom portions of the inner container. Of course, it will be readily understood that this condition will not appear under ordinary circumstances as the package is either completely flat or is completely "squared-up."

When it is desired to fill the container of the invention, it is "squared-up" or erected either manually or by means of a suitable device which exerts simultaneous pressure on the medial edges of end panels 7 and 8. The bottom portions of the inner container are folded flat in the plane of the hinge lines of the lower flaps, the resulting tabs are tucked in, and the flaps are inserted to completely close the lower end of the package. Preferably, top flaps 11, 12 and 13 are displaced sidewise or downwards in order to free the upper terminal portions of the inner container for the introduction of the liquid or solid material. This can be accomplished by any conventional filling machine. After the filling operation, the top opening of the inner container is sealed by means of a single, continuous and flat seam. This is accomplished by means of the following procedure:

First, the upper terminal portions of the inner container extending beyond the top hinge line of the side and end panels are flattened down into the position shown in Fig. 7. It will be observed that in this position the two ends of tabs 28 and 29 are of a different shape and character. Tab 28 has a side edge 30 which is the uppermost portion of the center fold line of liner B, while the terminal edge 31 of tab 29 is considerably shorter and is the uppermost portion of the registering side edges of liner B. It will be also noted (Fig. 10) that in this position top edge 32 of the inner container is completely flat and straight including portions thereof beyond main fold 27 which has been straigtened out into the same plane as the other portions of the top edge. This is an extremely important consideration in view of the fact that in this position the top edge of the inner container is completely free from re-entrant folds and of intervening layers of materials and consists only of two layers of material placed face to face against each other throughout the full length thereof.

In connection with forming the top seal of the inner envelope, attention is directed to the circumstance that there is an important cooperation between the direction in which the lateral terminal portions of the envelope beyond main fold 27 extend in the "squared-up" package and the direction in which the upper terminal portions of the envelope are bent down preliminary to forming the top seal. As it will be readily understood from Figs. 6 and 7, these lateral terminal portions of the envelope beyond main fold 27 extend parallel to end panel 8 and although they do not interfere with folding down the top portions of the envelope in the direction of arrow 40, they would prevent such folding in the opposite direction. In other words, the top terminal portions of the envelope must be bent or folded always in the same direction in which the terminal edges beyond the main fold are pointing.

Generally speaking, it is possible to apply a heat-seal along this upper edge already in this position. However, it is generally preferred to bend upper terminal edge 32 along line 33 into a substantially vertical position wherein it is more readily accessible to the sealing members. As it will be best observed in Figs. 7 and 8, line 33 is at a substantial distance from center line 34 of the package indicated in dotted line and is defined by the meeting point of terminal edge 31 of the liner and of triangular fold 35 formed by folding down the top portions of the inner container.

After the application of a continuous, straight and completely flat seal 36 to the upper edge of the inner container, the sealed marginal portion 37 may be folded down flat and tabs 28 and 29 may be folded inwardly either in a separate operation or simply by means of closing side flaps 11 and 12. It will be noted that in this position the top seal of the inner container is protected by means of fold line 33 and is not exposed directly to the inner pressure of the contents. Hereafter, top closure flap 13 may be inserted in the conventional manner and the package is ready for shipping.

Obviously, the contents may be of various character and their nature determines to a substantial extent the type of liner employed. Moreover, in some cases, particularly when the container is employed for coffee, it is desirable to remove the inner atmosphere from the container and to establish a vacuum therein. This is accomplished by means of a conventional vacuum pump prior to the sealing of the top seam. Generally speaking, the vacuum pump is connected to a flat snout by means of a conduit and this snout is inserted between the two registering top edges of the inner container. Due to the fact that the two registering side edges have a tendency of slight adherence to each other, thus rendering the introduction of the snout difficult, I prefer to make provision for providing at least a restricted area in the top edge wherein these marginal portions are of unequal length. This may be accomplished for example by means of providing a cut out portion 38 in the top edge of liner B at the time when it is being cut from a strip or web. This will result in a portion in the top edge of the inner container wherein the two layers of material facing each other are of unequal length, whereby the introduction of the vacuum snout is greatly facilitated. As it will be best observed in Figs. 2 and 3, the provision of this identation 38 will simultaneously provide a slight extension 39 in corresponding position at the bottom edge of liner B which, however, does not interfere in any way with the various steps involved in making the container and in using the same.

Fig. 10 illustrates a horizontal section of the top portion of the inner container just prior to the final sealing operation. It is apparent that the top seam has merely two layers of sheet-like material facing each other throughout the full length thereof, whereby re-entrant folds, intervening layers and similar danger points of leakage are completely eliminated.

Referring to Figs. 1 and 2, it will be seen that end panel 7 is provided with a short incision 14' along the lower portion of medial line 20 thereof, which is the fold line of both carton A and liner B. The object of this incision is to facilitate folding over the liner so that a completely flat fold is obtained where the bottom edge of the liner is heat-sealed. Due to the fact that carton and liner are adhesively secured to each other, when folding them over along said medial line, the inner liner is shortened and is caused to pucker up in said fold line. This is generally not objectionable and might have even certain advantages in that it assures that the inner bag will be larger than the outer carton and will be supported by the carton throughout. On the other hand, a minute re-entrant fold could be introduced in this manner into the transverse seal of the bottom edges of the liner and would constitute a danger point of leakage. This is avoided by the provision of incision 14' which permits the liner to fold flat starting from a point above the region of the lower transverse heat-seal and completely eliminates the danger of re-entrant folds.

The carton blank illustrated by way of example in Fig. 1 is of such a character that end panel 7 is not provided with a lower flap hingedly connected thereto. Of course, end panel 7 may be provided with such lower flaps, if desired, and in this case it is preferred to carry incisions 14' throughout the extension of the flap.

While in a package containing a liquid, such as milk or oil, etc., after the filling and sealing operations the physical appearance of the upper portion of the inner container will closely conform to the illustration in Figs. 7 to 9, when packaging coffee and similar granular materials, which are preferably preserved in a vacuous condition, the upper portions of the inner container will be depressed to some extent by the atmospheric pressure, as those skilled in the art will readily understand.

It will be noted that the container embodying the principles of the present invention provides various important advantages. First of all, a container of fluid-tight character is provided which may be shipped in a flat or knocked-down position to the place of use, thereby making possible great savings in shipping cost and space.

It is also to be observed that the container embodying the invention presents a completely fluid-tight structure throughout the full extension thereof so that the contents may be retained indefinitely in a completely sealed condition.

Moreover, the container of the invention incorporates only completely flat and continuous seams and at no place in the seam are more than two layers of the liner material facing each other. Thus, for the first time in the history of the art, a fluid-tight paper container has been provided which is completely free from re-entrant folds and doubled-up material in the seams whereby a hitherto unobtainable degree of freedom from leakage into or out of the container is realized.

Furthermore, the container of the invention may be manufactured in a simple and continuous manner directly from continuous stock by means of a few and simple operations and at a low cost.

Although the present invention has been described in connection with a preferred embodiment thereof, variations and modifications may be resorted to by those skilled in the art without departing from the principles of the present invention. Thus, it will be obvious that carton blank A may be modified in various ways in order to provide a shape which is the most economical in the use of board. Likewise, the top and the bottom flaps may have identical construction and the tucked-in extensions thereof may be omitted, if desired. I consider all of these variations and modifications to be within the true scope of the present invention as disclosed in the foregoing description and defined by the appended claims.

I claim:

1. A container in flat folded form capable of being erected comprising in combination an outer carton having closing flaps at each end and collapsed on medial fold lines in two opposite walls thereof and having other opposed walls in registry, an inner bag within said carton constituted of a single sheet of flexible material folded along one of said medial fold lines and having its free ends in substantially registering position and parallel with the other of said medial fold lines, and L-shaped seal closing said registering ends and the bottom ends of said sheet, said bag being adhesively secured in place within the carton at least to a pair of oppositely-spaced walls thereof and having its open and closed ends projecting free of the closing flaps of the carton, and an incision in the lower portion of the first one of said medial fold lines to facilitate formation of a completely flat fold in the corresponding region of said bag.

2. In the art of sealing the top filling opening of a package squared-up from flattened form including a form-sustaining outer carton and a flexible envelope with a fusible inner surface conforming to and adhesively secured to the inner surface of said carton and having a main lateral face to face seam folded to lie adjacent to, and extending in the direction of one of the end panels; the improvement which comprises bending down the upper terminal portions of said envelope into a substantially horizontal plane in the direction in which said main fold extends, flattening the mouth portions of said envelope in a single plane including the portions beyond said main fold, bending said flattened mouth portions upwards along a line at a distance from the center line at least equal to the width of the side seam of said package, and applying a flat transverse heat-seal across said flattened upturned mouth portions whereby a completely flat top seam free from re-entrant folds and intervening layers is provided and danger points of leakage are positively eliminated.

3. In the art of sealing the top filling opening of a package squared-up from flattened form including a form-sustaining outer carton and a flexible envelope with a fusible inner surface conforming to and adhesively secured to the inner surface of said carton and having a main lateral face to face seam folded to lie adjacent to, and extending in the direction of one of the end panels; the improvement which comprises bending down the upper terminal portions of said envelope into a plane defined by the upper hinge lines of the carton in the direction in which said main fold extends, flattening the mouth portions beyond said main fold, bending said flattened mouth portions upwards along a line at a distance from the center line and at least equal to the width of the side seam of the package, applying uniform heat and pressure along a narrow strip across said bent up mouth portions thereby forming a completely flat top heat-seal, free from re-entrant folds and intervening layers, and two tabs of unequal length, and subsequently tucking in said tabs into said carton.

HARRY F. WATERS.